United States Patent
Chraim et al.

(10) Patent No.: US 12,093,709 B1
(45) Date of Patent: Sep. 17, 2024

(54) NETWORK PERFORMANCE DRIVEN COMPUTE WORKLOAD PLACEMENT

(71) Applicant: Amazon Technologies, Inc., Seattle, WA (US)

(72) Inventors: Fabien Chraim, Wichita Falls, TX (US); Antonio Gomariz Penalver, Dublin (IE); Irina Lopatina, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 860 days.

(21) Appl. No.: 17/118,281

(22) Filed: Dec. 10, 2020

(51) Int. Cl.
  *G06F 9/455* (2018.01)
  *G06F 9/50* (2006.01)
  *G06F 11/30* (2006.01)
  *G06F 11/34* (2006.01)

(52) U.S. Cl.
  CPC ........ *G06F 9/45558* (2013.01); *G06F 9/5011* (2013.01); *G06F 9/5077* (2013.01); *G06F 11/3072* (2013.01); *G06F 11/3452* (2013.01); *G06F 2009/4557* (2013.01); *G06F 2009/45595* (2013.01)

(58) Field of Classification Search
  CPC .. G06F 9/45558; G06F 9/5011; G06F 9/5077; G06F 11/3072; G06F 11/3452; G06F 2009/4557; G06F 2009/45595
  See application file for complete search history.

(56) References Cited

U.S. PATENT DOCUMENTS

| | | | |
|---|---|---|---|
| 9,300,693 B1 * | 3/2016 | Manmohan | G06F 9/45558 |
| 9,697,028 B1 * | 7/2017 | Allen | G06F 9/45558 |
| 10,623,319 B1 * | 4/2020 | Talnikov | H04L 67/145 |
| 10,715,460 B2 | 7/2020 | Brooker et al. | |
| 2017/0315836 A1 * | 11/2017 | Langer | G06F 9/45558 |
| 2021/0151056 A1 * | 5/2021 | Trim | H04L 41/16 |
| 2022/0214926 A1 * | 7/2022 | Akiyama | G06F 9/5077 |
| 2022/0286409 A1 * | 9/2022 | Sun | H04L 45/70 |
| 2023/0195499 A1 * | 6/2023 | Connor | G06F 9/5027 709/226 |

* cited by examiner

*Primary Examiner* — Jacob D Dascomb
(74) *Attorney, Agent, or Firm* — S. Scott Foster; Kowert, Hood, Munyon, Rankin & Goetzel, P.C.

(57) ABSTRACT

A metric monitor may obtain data that measures network traffic of a network, through which a host may be accessed by clients, over one or more time windows. The metric monitor may determine one or more metrics based on the data obtained from the network over the time windows, which may represent performance of the network to the host. The metric monitor may provide the metrics to a workload management system to determine placement of a particular workload at the host.

20 Claims, 7 Drawing Sheets

NETWORK PERFORMANCE DRIVEN COMPUTE WORKLOAD PLACEMENT

BACKGROUND

The advent of cloud computing has provided benefits with respect to managing large-scale computing resources for many customers with diverse needs. Cloud computing use virtualization technologies to allow one or more physical computing resources to be shared by multiple customers. With the virtualization technologies, the computing resources can function as a host machine to host one or more instances or virtual machines to run applications for each of the customers. Each instance may be regarded as a software simulation acting as a distinct logical computing system that provides customers with the illusion that they are the sole operators and administrators of a given hardware computing resource, while also providing application isolation and security among the various instances.

Such a cloud or provider network generally include data centers of numerous interconnected computing system, set up at one or more geographical locations. Customers of the cloud or provider network subscribe to a computing service and access the computing resources remotely via network connections to create, configure, and manage their applications and/or instances). The network connections to a host machine thus become critical as to the performance of the workload placed at the host. Therefore, it is desirable to evaluate performance of the network for individual hosts in order to better decide placement of workload in a provider network.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments described herein relate to network performance based placement of virtualized computing resources (e.g., virtual machines, containers, volumes, serverless functions). The disclosed techniques can evaluate performance of network connections to individual hosts of a provider network, such as a cloud provider network, and use these performance metrics to influence the placement of virtualized resources. Evaluation of network performance may be performed by a metric monitor of the provider network, e.g., implemented with a cluster of computing resources. The metric monitor may obtain, for individual ones of a plurality of hosts, data representing measurements of network traffic for a network (which may include a plurality of networking devices) through which a host may be accessed by a client, and determine metrics representing performance of the network. These metrics may indicate the quality (e.g., how good) and/or occupancy (e.g., how busy) of the network. The metrics may be provided to a workload management system, e.g., implemented as part of the control plane of the provider network, for placing future workloads (including, e.g., virtualized resources such as virtual machine instances, containers, serverless functions, volumes and the like, as well as applications running on the virtualized resources) and/or adjusting the placement of existing workloads at the hosts of the provider network (for example, through migration).

The metric monitor may obtain the measurement data over multiple time windows. For each time window, the metric monitor may determine one or more metrics such as a loss subscription score, a utilization subscription score, and/or some other metrics. The loss subscription score may be calculated based on measurements of network traffic that gets lost within the network of a host over a time window, which may thus indicate the quality of the network—e.g., how good the network is at successfully moving the network traffic. The utilization subscription score may be calculated based on measurements of network utilization and throughput of the network over the time window, which may thus indicate the occupancy of the network—e.g., how busy the network is consumed by the network traffic. In some embodiments, the metric monitor may use the metrics of individual time windows as intermediate metrics, and calculate a final value (e.g., a weighted sum of the intermediate metrics) for each metric. The final metrics or scores may be provided to the workload management system for workload placements. For instance, the workload management system may rank the hosts according to their networks' quality and/or occupancy, and use the ranking to assist decision making of where to place an application and/or an instance at a particular host. In some embodiments, the metric monitor may determine some other metrics in order to evaluate the network performance.

In this disclosure, a provider network may broadly refer to a network or networks set up by an entity such as a company or a public sector organization to provide one or more services (such as various types of multi-tenant and/or single-tenant cloud-based computing or storage services) accessible via the Internet and/or other networks to a distributed set of clients. For instance, a provider network may include data centers housing numerous interconnected computing systems at one or more geographical locations. Each data center may include various computing resources, such as CPUs, GPUs, FPGAs, ASICs, memory, and/or associated software. A host may broadly refer to one or more computing resources of the provider network, e.g., a server or a group of servers in a rack or adjacent racks at a data center, to host workload (including, e.g., applications and/or instances) for clients. The provider network may use one or more metric monitor for each data center, or one or more metric monitors for multiple data centers, at each or multiple geographic locations.

Figure 1:
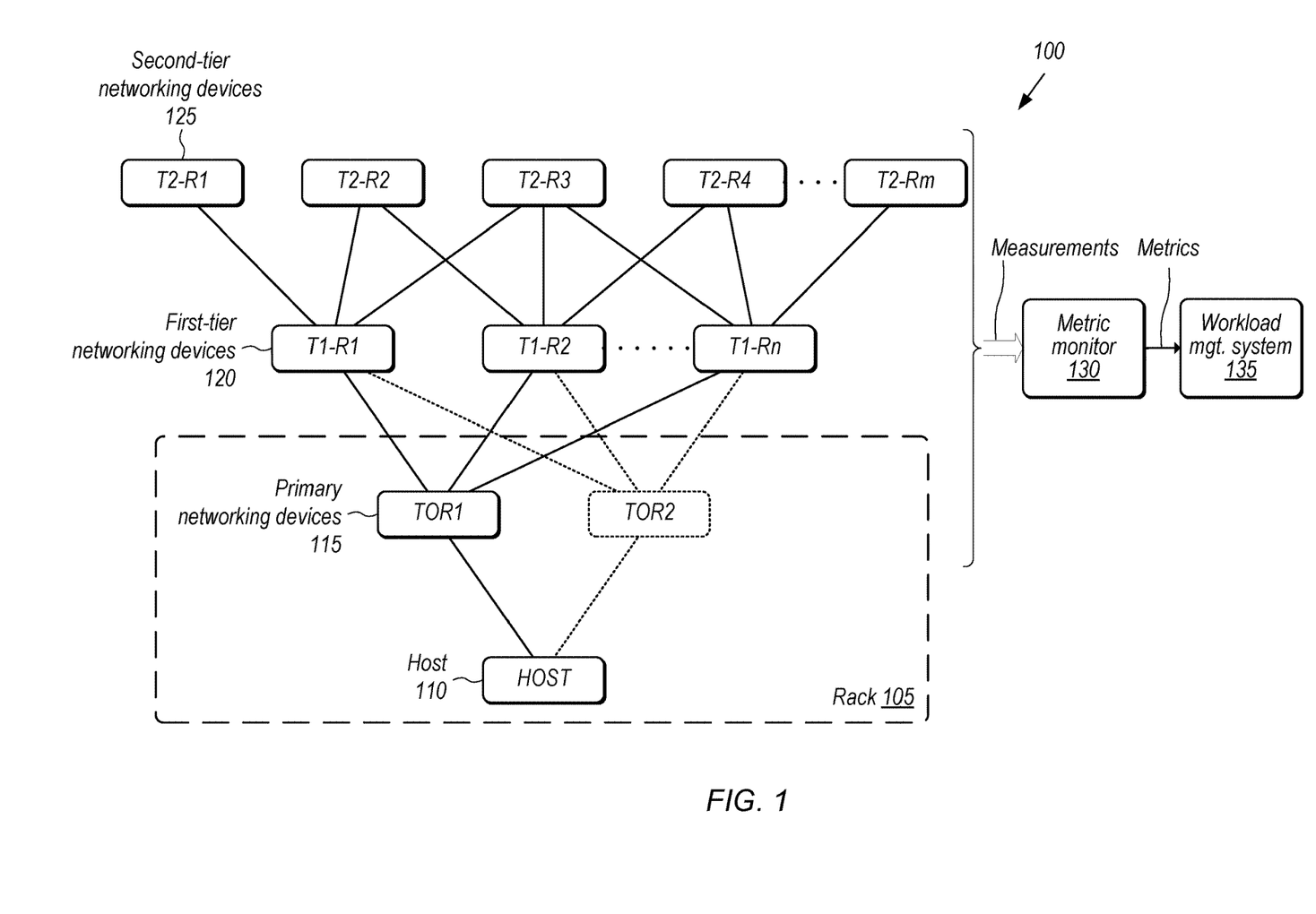
FIG. 1 shows an example metric monitor to evaluate network performance for a host, according to some embodiments.

FIG. 1 shows an example metric monitor to evaluate network performance for a host, according to some embodiments. To simplify illustration, not all but only relevant components are shown in FIG. 1. As shown in this example, network 100 may connect to host 110, through which clients may access host 100 to create, configure and use applications and/or instances. Network 100 may include primary networking devices 115 that may connect a plurality of networking devices 120 and 125 to host 110. For instance, host 110 may represent one or more computing resource in rack 105 at a data center, whilst primary networking device 115 may refer to a top-of-rack (TOR) networking device (e.g., a switch and/or another networking devices) that may directly connect computing resources (e.g., computing resources of host 110 and/or some other hosts) in the same or adjacent racks. As shown in FIG. 1, primary networking devices 115 may further connect to first-tier networking devices 120 (e.g., routers, switches, gateways, and/or some other networking devices), which may in turn connect to second-tier networking devices 125 (e.g., routers, switches, gateways, and/or some other networking devices), and so on. For purposes of illustration, only two tiers of connection (including e.g., first-tier networking devices 120 and second-tier networking devices 125) beyond primary networking device 115 is shown in FIG. 1. In some embodiments, network 100 may include more tiers of connection between host 110 and clients. Further, for purposes of illustration, FIG. 1 shows two primary networking devices 115 (e.g., TOR1 and TOR2) directly connected to host 110. In some embodiments, there may be less (e.g., one single primary network device such as TOR1) or more (e.g., more than two) primary networking devices 115 connecting host 110 to the rest of network 100. In addition, FIG. 1 shows only one host 110 as an example for purposes of illustration. In some embodiments, a provider network may include multiple hosts each of which may be accessible through a network, and the provider network may include one more metric monitors which may determine performance metrics for the network of each host.

The networking devices (e.g., primary networking device 115, first-tier networking devices 120, and/or second-tier networking devices 125 as shown in this example) of network 100 for host 110 may individually collect data measuring the network traffic flowing through the interfaces of the individual networking devices to/from host 110. For instance, the measures at an interface of a networking device may include source and destination addresses of packets received and/or transmitted at the interface, the number of packets received and/or transmitted, total bytes in the flow, time stamp in the flow, packet delay, packet loss, bandwidth measurements (capacity, achievable throughputs), and the like. Metric monitor 130 may obtain the measurements from the individual networking devices (e.g., primary networking device 115, first-tier networking devices 120, and/or second-tier networking devices 125), e.g., using agents installed at the individual networking devices under various protocols, such as SNMP (RFC 1157), RMON (RFC 1757), Netflow (RFC 3954), or some other active or passive network traffic monitoring protocols. For instance, the measurement data may be pulled from the individual networking devices (e.g., primary networking device 115, first-tier networking devices 120, and/or second-tier networking devices 125) by metric monitor 130, according to some embodiments. Alternatively, in some embodiments, the measurements may be pushed by the individual networking devices (e.g., primary networking device 115, first-tier networking devices 120, and/or second-tier networking devices 125) to metric monitor 130.

Metric monitor 130 may calculate one or more metrics based on the measurements from the individual networking devices (e.g., primary networking device 115, first-tier networking devices 120, and/or second-tier networking devices 125), which may represent performance of network 100. To simplify the explanation, the metrics may be determined at the point of view of primary networking devices 115 (e.g., TOR1 and/or TOR2) and include measures from only one tier of connection beyond primary networking devices 115 (e.g., the connection including first-tier networking devices 120). In other words, the metrics may be calculated using measurements corresponding only to the connection between primary networking devices 115 (e.g., TOR1 and/or TOR2) and first-tier networking devices 120 (e.g., T1-R1, T1-R2 . . . and/or T1-Rn). Note that this is mainly an example for purposes of illustration. In some embodiments, the calculation of the metrics may leverage the measurements from other tiers of connection (e.g., those between first-tier networking devices 120 and second-tier networking devices 125, and so on). In addition, in some embodiments, network 100 may include redundant connection between some of the networking devices. For instance, a second-tier networking device 125 (e.g., T2-R2) may connect to multiple first-tier networking devices (e.g., T1-R1 and T1-R2). Therefore, the measurements or metrics based on the measurements corresponding to such redundant connections may be "weighted" to appropriately reflect the connection redundancy. The further the tier is beyond primary networking devices 115, the more connection redundancy the tier may include, and the less weight may be applied to scale down the measurements or metrics based on such measurements. For instance, a measurement or metric based on a measurement corresponding to a connection between a second-tier networking device and a-third tier networking device may be scaled down further than a measurement or metric based on a measurement corresponding to a connection between a first-tier networking device and a primary networking device, and so on.

Metric monitor 130 may determine one or more metrics including a loss subscription score and a utilization subscription score based on the measurement data for a particular time window. The loss subscription score may be calculated based on measurements of network traffic that gets lost in network 100 for host 110. Therefore, the loss subscription score may indicate the quality of network 100—e.g., how good network 100 is at successfully moving the network traffic to/from host 110—over the particular time window. The loss subscription score may be calculated by counting the duration of time that network 100 (e.g., in this example, one tier of connection between primary network devices 115 and first-tier networking devices 120) satisfies a packet loss threshold. In some embodiments, the loss subscription score may be calculated according to equation (1):

$$\text{score}_{loss} = \frac{\sum \text{loss compliant interface minutes}}{\sum \text{interface minutes}} \quad (1)$$

Here, the denominator Σ(interface minutes) may refer to a total duration of time of interfaces of primary networking devices 115 over the particular time window. For instance, given that primary networking devices TOR1 and TOR 2 each has 3 interfaces (or ports) that are connected respectively to first-tier networking devices T1-R1, T1-R2, and T1-Rn, Σ(interface minutes) may equal to 30 interface minutes over a time window of 5 minutes—e.g., the product of a total number of interfaces (e.g., 6) multiplying a length of the time window (e.g., 5 minutes). Referring back to equation (1), the numerator Σ(loss compliant interface minutes) may refer to a total duration of time within which the interfaces of primary networking devices 115 (e.g., connected to first-tier networking devices 120) satisfy a packet loss threshold Tloss. Here, the packet loss threshold Tloss may indicate a percentage of the packets transferred over the particular time window that gets lost, e.g., 1%. In some embodiments, the packet loss threshold Tloss may or may not be a fixed value for all the hosts and/or clients of a provider network. For instance, the packet loss threshold Tloss be determined according to type(s) of workload(s), hardware configuration(s) of host(s), etc. In some embodiments, the packet loss threshold Tloss may be included as a requirement in a service-level agreement (SLA) of a provider network. In some embodiments, the loss compliant interface minutes for a particular interface may be calculated according to equation (2):

$$\text{loss compliant interface time} = \begin{cases} \text{a duration of time within which a packet loss} < T_{loss} \\ 0, \text{ when the packet loss} > T_{loss} \end{cases} \quad (2)$$

For instance, given that the measurement data obtained by metric monitor 130 from network 100 (e.g., from primary networking devices 115 and/or first-tier networking devices 120) is collected at an interval of every minute over a time window of 5 minutes, there may be a total of 10 measurement points for a particular interface of primary networking devices 115 (e.g., port 2 of TOR1). If a percentage of packet loss measured at this particular interface (e.g., port 2 of TOR1) is less than 1% at 4 of the 5 measurement points, the loss compliant interface minutes for this particular interface (e.g., port 2 of TOR1) is 4 minutes—e.g., the product of the compliant measurement points (e.g., 4) multiplying the sampling interval (e.g., 1 minute). Table 1 shows the above example in more detail:

TABLE 1

|  | Minute 0 | Minute 1 | Minute 2 | Minute 3 | Minute 4 |
| --- | --- | --- | --- | --- | --- |
| TOR1-Int. 1 | 0.2% | 1% | 0.5% | 0.1% | 0.8% |
| TOR1-Int. 2 | 0.3% | 0.4% | 1.5% | 0.1% | 1.2% |
| TOR1-Int. 3 | 0.6% | 0.5% | 0.9% | 0.6% | 0.6% |
| TOR2-Int. 1 | 0.3% | 0.8% | 0.5% | 1.4% | 0.7% |
| TOR2-Int. 2 | 0.5% | 1.1% | 0.2% | 0.1% | 0.8% |
| TOR2-Int. 3 | 0.2% | 0.5% | 1% | 0.2% | 0.8% |

As shown in Table 1, each cell may represent a measured percentage packet loss (e.g., a percentage of network traffic that gets lost) at an interface (e.g., indicated by the first column) at a measurement interval (e.g., indicated by the first row) over a time window (e.g., 5 minutes). Given the number of interfaces (e.g., a total of 6 interfaces for primary networking devices 115 TOR1 and TOR2) and the length of the time window (e.g., 5 minutes), there are 30 interface minutes over this particular time window—e.g., the product of a total number of interfaces (e.g., 6) multiplying a length of the time window (e.g., 5 minutes), as described above. Within the 30 interface minutes, there are 24 interface minutes within which the interfaces satisfy the loss threshold, e.g., having a measured percentage packet loss less than Tloss (e.g., 1%), and 6 interface minutes within which the interfaces fail to satisfy the loss threshold (e.g., the highlighted cells). Therefore, the loss subscription score equals to 0.8—e.g., the quotient of 24 loss compliant interface minutes divided by 30 total interface minutes.

The inclusion of all the interface between primary networking devices 115 and first-tier networking devices 120 in the calculation of the metrics (e.g., the loss subscription score) may be viewed as a "spatial aggregation"—e.g., to aggregate all the relevant interface minutes of the target tier for performance evaluation of network 100. In addition, as shown in the example, a loss subscription score of 1 may indicate "best" performance of network 100 (e.g., corresponding to "minimal" subscription of host 110) where no packet loss violation is recorded over a particular time window, whilst a loss subscription score of 0 may correspond to "worst" performance of network 100 (e.g., corresponding to "maximal" subscription of host 110) where continuous packet loss violation is observed over the particular time window. Therefore, the loss subscription score may highlight a host—e.g., one or more computing resources in a rack—that should be avoided for workload placement because its network connection is currently experiencing unacceptable packet loss.

In some embodiments, metric monitor 130 may also calculate a utilization subscription score based on measurements of utilization of the networking devices of network 100 for host 110. Therefore, the utilization subscription score may indicate the occupancy of network 100—how busy network 100 is consumed by the network traffic to/from host 110—over a particular time window. The utilization subscription score may be calculated by counting the utilization in a duration of time when network 100 (e.g., in this example, the tier of connection between primary network devices 115 and first-tier networking devices 120) satisfies a utilization threshold. In some embodiments, the loss subscription score may be calculated according to equation (3):

$$\text{score}_{utilization} = \frac{\sum \text{compliant utilization}}{\sum \text{interface minutes}} \quad (3)$$

Here, the denominator $\Sigma$(interface minutes) may refer to a total duration of time of interfaces of primary networking devices 115 over the particular time window. As described above, for instance, given that primary networking devices TOR1 and TOR 2 each has 3 interfaces (or ports) that are connected respectively to first-tier networking devices T1-R1, T1-R2, and T1-Rn, $\Sigma$(interface minutes) may equal to 30 interface minutes over a time window of 5 minutes—e.g., the product of a total number of interfaces (e.g., 6) multiplying a length of the time window (e.g., 5 minutes). Referring back to equation (3), the numerator $\Sigma$(compliant utilization) may refer to a sum of utilization in the duration of time when the interfaces of primary networking devices 115 satisfy a utilization threshold Tutilization. Here, the utilization threshold Tutilization may indicate a percentage of the bandwidth that is consumed by network traffic for an interface, e.g., 70%. In some embodiments, the compliant utilization for a particular interface may be calculated according to equation (4):

$$\text{compliant utilization} = \begin{cases} \text{utilization, when the utilization} < T_{utilization} \\ 0, \text{ when the utilization} > T_{utilization} \end{cases} \quad (4)$$

For instance, given that the measurement data obtained by metric monitor 130 from network 100 is collected at an interval of every minute over a time window of 5 minutes, there may be a total of 10 measurement points for a particular interface of primary networking devices 115 (e.g., port 2 of TOR1). If utilization measured at this particular interface (e.g., port 1 of TOR2) is less than 70% at 3 of the 5 measurement points, $\Sigma$(compliant utilization) may equal to a sum of the utilization values in the 3 compliant measurements. Table 2 shows the above example in more detail:

TABLE 2

|           | Minute 0 | Minute 1 | Minute 2 | Minute 3 | Minute 4 |
|-----------|----------|----------|----------|----------|----------|
| TOR1-Int. 1 | 62%    | 68%      | 72%  | 69%      | 68%      |
| TOR1-Int. 2 | 34%    | 47%      | 55%      | 37%      | 39%      |
| TOR1-Int. 3 | 40%    | 42%      | 34%      | 45%      | 45%      |
| TOR2-Int. 1 | 53%    | 42%      | 33%      | 41%      | 44%      |
| TOR2-Int. 2 | 71%| 68%      | 54%      | 38%      | 66%      |
| TOR2-Int. 3 | 80%| 73%  | 65%      | 32%      | 45%      |

As shown in Table 2, each cell may represent a measured utilization (e.g., a percentage of the bandwidth that is consumed by the network traffic) at an interface (e.g., indicated by the first column) within a measurement interval (e.g., indicated by the first row) over a time window (e.g., 5 minutes). Given the number of interfaces (e.g., a total of 6 interfaces for primary networking devices 115 TOR1 and TOR2) and the length of the time window (e.g., 5 minutes), there are 30 interface minutes over this particular time window—e.g., the product of a total number of interfaces (e.g., 6) multiplying a length of the time window (e.g., 5 minutes) as described above. Within the 30 interface minutes, there are 26 interface minutes within which the interfaces of primary networking devices 115 satisfy the utilization threshold, e.g., having a percentage utilization less than Tutilization (e.g., 70%), and 4 interface minutes within which the interfaces fail to satisfy the utilization threshold (e.g., the highlighted cells). Therefore, $\Sigma$(compliant utilization) equals to the sum of the compliant percentage utilization (excluding the four percentage utilizations that exceed 70%)—e.g., 1266%, and the utilization subscription score equals to 42.2%—e.g., the quotient of 1266% compliant utilization divided by 30 interface minutes. Given that the utilization indicates the occupancy of networking interfaces for a host (e.g., one or more computing resources in one or adjacent racks), the utilization subscription score may be used to steer placement decision towards underutilized hosts, thereby reducing the risk of future impact to clients. Note that the compliant utilization calculated according to the utilization threshold, e.g., in equations (3)-(4), is provided merely as an example for purposes of illustration. In some embodiments, one or more other metrics may be determined with analysis of the utilization measurements of the networking devices. For instance, in some embodiments, metric monitor 130 may determine an average for the utilization of the interfaces of primary networking devices 115 (e.g., TOR1 and/or TOR2), identify a maximum (or some other statistical values, e.g., a P90 value) for the utilization of the interfaces of primary networking devices 115 (e.g., TOR1 and/or TOR2), and the like. These metrics may be also be used by metric monitor 130 to represent performance of network 100.

In some embodiments, metric monitor 130 may calculate the metrics, e.g., the loss subscription score, utilization subscription score, and/or some other metrics, based on measurement data obtained over multiple time windows. This is because a client's workload may not necessarily stay always consistent, but rather fluctuate over time. Therefore, monitoring and calculation over multiple time windows may better capture the client's overall usage of the computing resources at host 110, and thus provide more accurate evaluation of the network performance for host 110. The inclusion of measurements across several times windows in the calculation of the metrics may be viewed as a "temporal aggregation"—e.g., to aggregate interface minutes from several time periods for performance evaluation of network 100.

In some embodiments, metric monitor 130 may use the metrics for each time window as intermediate metrics, and calculate the final values for the metrics (e.g., the loss subscription score and/or utilization subscription score) based on the intermediate metrics. For instance, metric monitor 130 may first calculate the intermediate metrics for a 5-minute time window, a 15-minute time window, and a 60-minute time window, and then calculate the final metrics based on a weighted sum of the intermediate metrics of the three time windows according to equations (5) and (6):

$$\text{score}_{loss} = \alpha_5 \times \text{score}_{loss\_5} + \alpha_{15} \times \text{score}_{loss\_15} + \alpha_{60} \times \text{score}_{loss\_60} \quad (5)$$

$$\text{score}_{utilization} = \beta_5 \times \text{score}_{utl.\_5} + \beta_{15} \times \text{score}_{utl.\_15} + \beta_{60} \times \text{score}_{utl.\_60} \quad (6)$$

Where parameters $\alpha 1$, $\alpha 15$, and $\alpha 60$ represent the weights for the intermediate loss subscription scores of the 5-minute, 15-minute, and 60-minute time windows, and parameters $\beta 1$, $\beta 15$, and $\beta 60$ represent the weights for the intermediate utilization subscription scores of the 5-minute, 15-minute, and 60-minute time windows. In some embodiments, the 5-minute, 15-minute, and 60-minute time windows may be non-overlapped or overlapped consecutive time windows, or non-overlapped non-consecutive time windows. Further, the time windows may be in various sequence. For instance, the 5-minute time window may be displaced ahead of 15-minute and 60-minute time windows. But in another example, the 5-minute time window may begin after the end of the 15-minute and 60-minute time windows. In addition, the number of time windows (e.g., 3) and/or the lengths of the time windows (e.g., 5 minutes, 15 minutes, and/or 60 minutes) are selected merely for purposes of illustration. In some embodiments, metric monitor 130 may calculate intermediate metrics for a different number of time windows and/or time windows of different lengths. In addition, in some embodiments, a sum of the weights (e.g., $\alpha$ and $\beta$) may be subject to the constraints in equations (7) and (8), e.g., to maintain the final values of the metrics in the range of 0 and 1:

$$\alpha_5 + \alpha_{15} + \alpha_{60} = 1 \quad (7)$$

$$\beta_5 + \beta_{15} + \beta_{60} = 1 \quad (8)$$

In some embodiments, metric monitor 130 may provide the final metrics (e.g., the loss subscription score and/or utilization subscription score) to workload management system 135 for decision making of workload placement at hosts (including, e.g., host 110) of a provider network.

The values of the weights (e.g., $\alpha$ and $\beta$) may be determined in various ways. For instance, the weighs may be determined according to the type of a client's workload and/or another similar workload at host 110. For instance, some applications (e.g., video calls) may tend to invoke bursts of data transmission in a short period of time. Therefore, for those types of applications, recency may be more important—e.g., the intermediate metric calculated based on measurements from a recent 5-minute time window close to the burst may be more important than the intermediate metrics from previous 15-minute and/or 60-minute time windows—and thus $\alpha 5$ may be assigned with a larger value than $\alpha 15$ and $\alpha 60$. In another example, when applications (e.g., video streaming) tend to rely on consistent network traffic over an extended period of time, consistency may be more important, and thus $\alpha 5$, $\alpha 15$, and $\alpha 60$ may be assigned with approximately identical values. In some embodiments, the parameters (e.g., $\alpha$ and $\beta$) may be tuned according to testing. For instance, a test may be performed (e.g., by a metric monitor developer) to identify a correlation between intermediate metrics and workload performance for a host, according to which the weights may be specified. As described above, in some embodiments, metric monitor 130 may determine some other metrics for evaluation of the network performance. For instance, metric monitor 130 may calculate one or more metric(s) according to measurements with respect to packet delay. Note that FIG. 1 is a non-limiting example for purposes of illustration only. In some embodiments, the metric monitor described above may be used to place applications, instances, and/or some other types of workloads or virtualized resources (such as containers, serverless functions, and/or volumes) at a selected one of a plurality of hosts.

Figure 2:
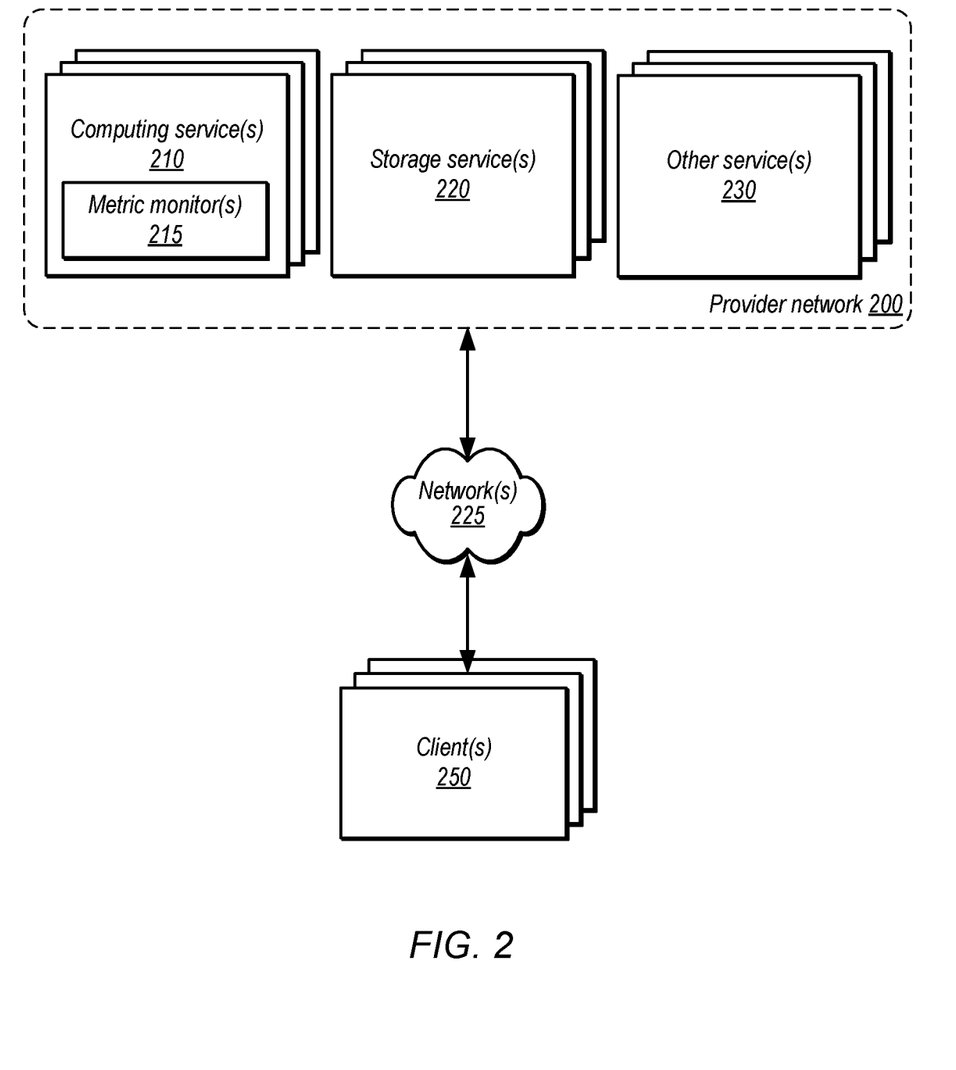
FIG. 2 shows an example provider network, according to some embodiments.

FIG. 2 shows an example provider network, according to some embodiments. In FIG. 2, provider network 200 may be a private or closed system or may be set up by an entity such as a company or a public sector organization to provide one or more services (such as various types of cloud-based storage) accessible via the Internet and/or other networks to one or more client(s) 205. Provider network 200 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and storage services offered by provider network 200. Provider network 200 may implement various cloud services, such as computing service(s) 210, data storage service(s) 220 (e.g., object storage services, block-based storage services, or data warehouse storage services), as well as other service(s) 230, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Some implementations of the provider network 200 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks. The control plane may include a workload management system (e.g., like workload management system 135 in FIG. 1) which may determine, e.g., based at least in part on the metrics from a metric monitor (like metric monitor 130 in FIG. 1), the placement of workloads at various computing resources of the provider network.

Computing service(s) 210 may implement various computing resources at one or more data centers. The computing services 210 can include an elastic compute cloud service (referred to in various implementations as an elastic compute service, a virtual machines service, a computing cloud service, a compute engine, or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. The disclosed placement techniques can select a suitable host for the requested instance type based at least partly on the described network performance metrics.

The computing services 210 can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine. A container engine can run on a virtual machine instance in some implementations, with the virtual machine instance selected based at least partly on the described network performance metrics.

Computing service(s) 210 may allow client(s) 250 (e.g., based on a rental or subscription contract) to access the computing resources remotely through network connections to run their own computer applications and/or instances at the hosts. Client(s) 250 may be each associated with an account with assigned authorities, according to which client(s) 250 may create, configure, and/or use workload (e.g., applications and/or instances) at the hosts. In some embodiments, computing service(s) 210 may include metric monitor(s) 215 (e.g., like metric monitor 130 described above in FIG. 1), e.g., arranged at one or more data centers, at the same or different geographical locations. For instance, computing service(s) 210 may implement one metric monitor for each data center, which may calculate metrics (e.g., loss subscription score and/or utilization subscription score) for individual racks in each data center. The metrics may be further provided to a workload management system (e.g., like workload management system 135 in FIG. 1) of provider network 200 to manage placement of workloads at the racks.

Data storage service(s) 220 may implement different types of data stores for storing, accessing, and managing data on behalf of client(s) 205 as a network-based service that enables one or more client(s) 205 to operate a data storage system in a cloud or network computing environment. For example, data storage service(s) 220 may include various types of database storage services (both relational and non-relational) or data warehouses for storing, querying, and updating data. Such services may be enterprise-class database systems that are scalable and extensible. Queries may be directed to a database or data warehouse in data storage service(s) 220 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 220 may also include various kinds of object or file data stores for putting, updating, and getting data objects or files, which may include data files of unknown file type. Such data storage service(s) 220 may be accessed via programmatic interfaces (e.g., APIs) or graphical user interfaces. Data storage service(s) 220 may include an elastic block store service (referred to in various implementations as a cloud disks service, a managed disk service, a cloud block storage service, a persistent disk service, or a block volumes service) that provides virtual block-based storage for maintaining data as part of data volumes that can be "attached" to compute instances, similar to local block-based storage devices (e.g., hard disk drives, solid state drives, etc.), and may be accessed utilizing block-based data storage protocols or interfaces, such as internet small computer interface (iSCSI).

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 220. Various other distributed processing architectures and techniques may be implemented by data processing services (e.g., grid computing, sharding, distributed hashing, etc.). Note that in some embodiments, data processing operations may be implemented as part of data storage service(s) 220 (e.g., query engines processing requests for specified data).

Generally speaking, client(s) 205 may encompass any type of client configurable to submit network-based requests to provider network 200 via network(s) 225, including requests for computing services (e.g., a request to create, configure, and manage applications and/or instances in computing service(s) 210, etc.). For example, a given client 205 may include a suitable version of a web browser, or may include a plug-in module or other type of code module configured to execute as an extension to or within an execution environment provided by a web browser. Alternatively, a client 205 may encompass an application such as a database application (or user interface thereof), a media application, an office application or any other application that may make use of computing resources in computing service(s) 210 to execute code(s) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 205 may be an application configured to interact directly with provider network 200. In some embodiments, client(s) 205 may be configured to generate network-based services requests according to a Representational State Transfer (REST)-style network-based services architecture, a document- or message-based network-based services architecture, or another suitable network-based services architecture.

In various embodiments, network(s) 225 may encompass any suitable combination of networking hardware and protocols necessary to establish network-based-based communications between client(s) 205 and provider network 200. For example, network(s) 225 may generally encompass the various telecommunications networks and service providers that collectively implement the Internet. Network(s) 225 may also include private networks such as local area networks (LANs) or wide area networks (WANs) as well as public or private wireless networks. For example, both a given client 205 and provider network 200 may be respectively provisioned within enterprises having their own internal networks. In such an embodiment, network(s) 225 may include the hardware (e.g., modems, routers, switches, load balancers, proxy servers, etc.) and software (e.g., protocol stacks, accounting software, firewall/security software, etc.) necessary to establish a networking link between given client 205 and the Internet as well as between the Internet and provider network 200. It is noted that in some embodiments, client(s) 205 may communicate with provider network 200 using a private network rather than the public Internet.

Figure 3:
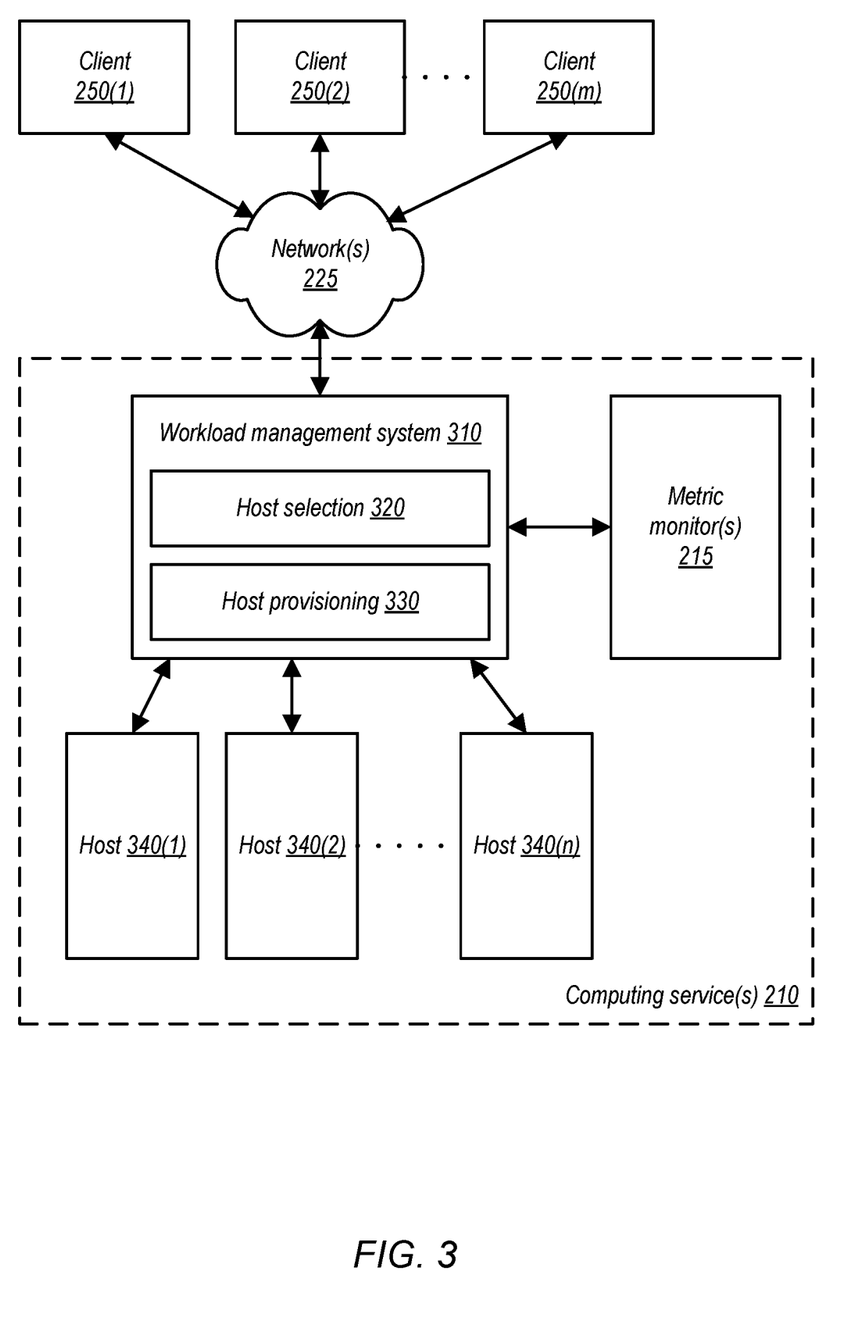
FIG. 3 shows an example workload management system, according to some embodiments.

FIG. 3 shows an example workload management system, according to some embodiments. As shown in this example, workload management system 310 may be implemented as part of computing service(s) 210 for managing computing resources of computing service(s) 210. Computing service(s) 210 may receive, at workload management system 310, request(s) from client(s) 250 (e.g., client 250(1), 250(2), . . . , 250(m)) via network(s) 225 to obtain computing resources at host(s) 340 (e.g., host 340(1), 340(2), . . . , 340(n)) of computing service(s) 210 to operate workload(s) (e.g., application(s), instance(s), and/or container(s)). For instance, workload management system 310 may receive a request from client 250(1) to host a virtualized resource at one of host(s) 340 (e.g., to virtualize one of host(s) 340 to operate one or more applications, virtual machine instances, containers, serverless functions, volumes, and/or the like). Workload management system 310 may obtain metrics (e.g., loss subscription score(s) and/or utilization subscription score(s)) from metric monitor(s) 215 which may represent networking performance for individual ones of host(s) 340. For instance, workload management system 310 may obtain metrics including a loss subscription score and/or a utilization subscription score from metric monitor(s) 215 for the network of each host (e.g., 340(1), 340(2), . . . , 340(n)), through which host 340(1), 340(2), . . . , 340(n) may be accessed by client(s) 250. As described above, the loss subscription score and/or the utilization subscription score may be calculated based on measurement data obtained from only the first tier of connection (e.g., including only the TOR primary networking devices and the first-tier networking devices beyond the TOR primary networking devices). In some embodiments, workload management system 310 may obtain some other metrics, such as those indicating location(s) of client(s) 250 and/or host(s) 340, hardware configuration or resource capacity of host(s) 340, existing occupancy or available resource capacity of host(s) 340, types of computing resources at host(s) 340, types of the workload(s) (e.g., type(s) of the application(s)), and so on.

Workload management system 310 may include host selection 320 which may select a particular host out of host(s) 340 based on the obtained metrics including those (e.g., a loss subscription score and/or a utilization subscription score) from metric monitor(s) 215. For instance, workload management system 310 may select host 340(2) to host the application and/or instance specified in the request from client 250(1) based, at least in part, on the loss subscription score and/or utilization subscription score for host 340(2). In addition, workload management system 310 may include host provisioning 330 which may provision the selected host to host the workload(s) for client(s) 250. For instance, workload management system 310 may configure host 340(2) according to the virtualized resource to be hosted for client 250(1) and then begin to operate the virtualized resource on host 340(2). In some embodiments, computing service(s) 210 may provide response(s), e.g., via network(s) 225, for the request(s) of client(s) 250.

Figure 4:
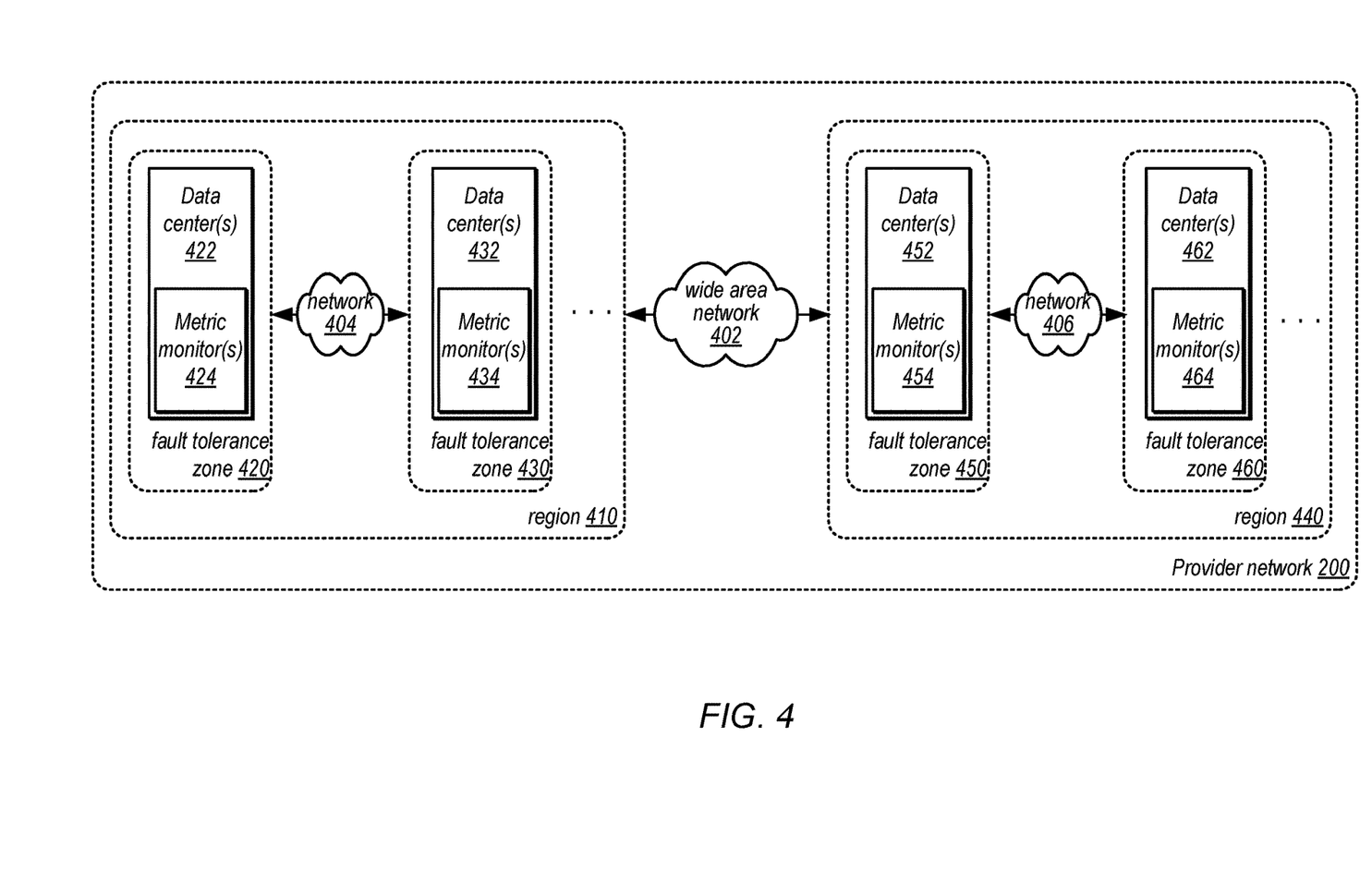
FIG. 4 shows an example arrangement of metric monitors within a provider network, according to some embodiments.

FIG. 4 shows an example arrangement of metric monitors within a provider network, according to some embodiments. For example, provider network 200 may offer different regions, such as regions 410 and 440. Each region may be a geographic area, which may offer best performance for external clients, systems, or devices within the geographic area. For example, a client device located in region 410 may receive best performance when utilizing a cloud service (e.g., computing service(2) 210, storage service(s) 220, and/or other service(s) 230) implemented in region 410 of provider network 200. In this way, users can identify regions nearest users of applications implemented in provider network 200 to provide a best performance location for their application.

In some embodiments, communications between regions (or from other external systems) may be sent via a wide area network 402 (e.g., the Internet). Therefore, private network communications may not be supported between region 410 and 440, in some embodiments (although encryption or other security features could be implemented to protect information traversing between the regions in wide area network 402). Within a region, however, communications may traverse private networks, such as networks 404 and 406. For instance, a compute instance 422 hosted in fault tolerance zone 420 may send a communication to a compute instance 432 via a private network 404 of service provider network 200, even though the compute instances are in different fault tolerance zones, 420 and 430.

In some embodiments, fault tolerance zones may be implemented to limit failure so that the availability of computing resources implemented within a fault tolerance is enhanced. A region may implement multiple fault tolerance zones (e.g., fault tolerance zones 420 and 430 in region 410, and fault tolerance zones 450 and 460 in region 440). Each fault tolerance zone may implement computing resources, such as data center(s) 422 in fault tolerance zone 420, data center(s) 432 in fault tolerance zone 430, data center(s) 452 in fault tolerance zone 450, and data center(s) 462 in fault tolerance zone 460. In some embodiments, one or more metric monitor(s) (e.g., like metric monitor 130 in FIG. 1) may be assigned to the data center(s) at individual fault tolerance zones, such as metric monitor(s) 424 for data center(s) 422 in fault tolerance zone 420, metric monitor(s) 434 for data center(s) 432 in fault tolerance zone 430, metric monitor(s) 454 for data center(s) 452 in fault tolerance zone 450, and metric monitor(s) 464 for data center(s) 462 in fault tolerance zone 460. Metric monitor(s) 424, 434, 454, and 456 may calculate metrics (e.g., loss subscription scores and/or utilization subscription scores) representing performance of network connections for individual hosts or racks at data center(s) 422, 432, 452, and 462. In some embodiments, the metrics may be provided to workload management system(s) (e.g., like workload management system 135 in FIG. 1) of provider network 200 for workload placement at the hosts or racks (e.g., at data center(s) 422, 432, 452, and 462). The decision for workload placement may be performed on the level of data centers, tolerance zones, regions, and/or the entire provider network.

Figure 5:
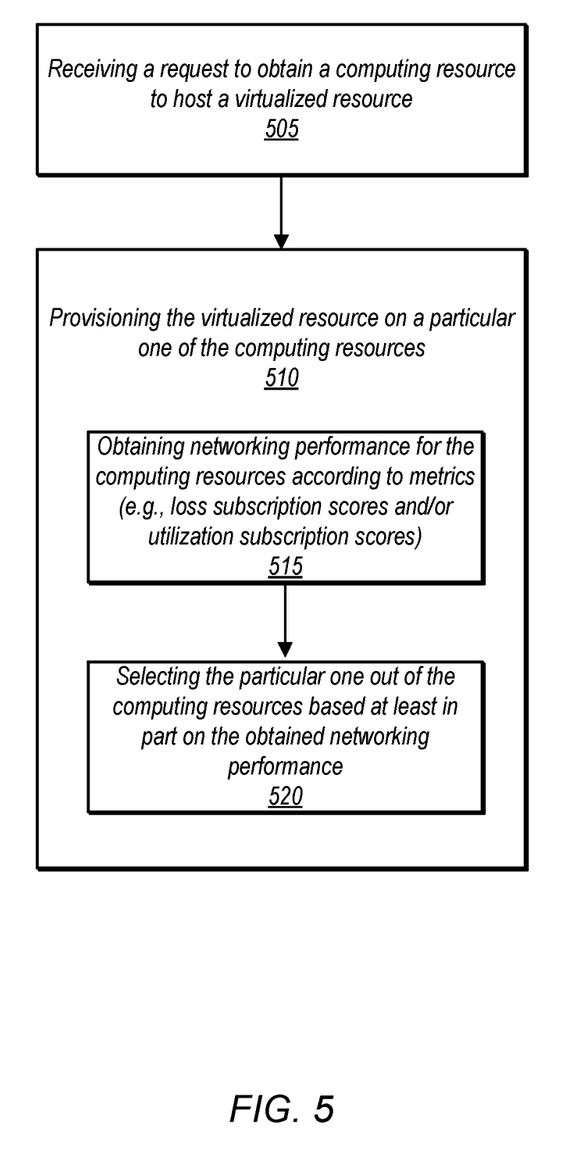
FIG. 5 is a high-level flowchart showing methods and techniques for placing a workload at one of a plurality of computing resources, according to some embodiments.

FIG. 5 is a high-level flowchart showing methods and techniques for placing a workload at one of a plurality of computing resources, according to some embodiments. As shown in this example, in some embodiments, a request may be received at a workload management system (e.g., like workload management system 135 in FIG. 1) to obtain one of a plurality of computing resources (e.g., like hosts 340 in FIG. 3) to host a virtualized resource (including, e.g., a virtual machine instance, a container, a serverless function, and/or a volume), as indicated in block 505. In some embodiments, the virtualized resource may be provisioned on a particular one of the computing resources, e.g., by the workload management system, as indicated in block 510. To provision the virtualized resource on the particular computing resource, one or more metrics may be obtained by the workload management system, as indicated in block 515. In some embodiments, the metrics may include one or more metrics (e.g., a loss subscription score, a utilization subscription score, and/or some other metrics such as one calculated with the statistical analysis of the utilization of the interfaces of a networking device as described above) that represent networking performance for each of the computing resources. As described above, the loss subscriptions scores for the computing resources may be calculated according to a loss threshold (e.g., Tloss), whilst the utilization subscription scores for the computing resources may be calculated according to a utilization threshold (e.g., Tutilization). In addition, as described above, the workload management system may obtain some other metrics, such as locations of the computing resources and/or clients, available resource capacity of the computing resources, types of the computing resources, the type of the virtualized resource, and so on. The particular one of the computing resources on which the virtualized resource is placed may be selected out of the computing resources based, at least in part on, the metrics (e.g., a loss subscription score and/or a utilization subscription score) representing the networking performance for the computing resources, as indicated in block 520, as well as having a suitable type and capacity of a set of hardware resources that support the requested virtualized resource. In some embodiments, the selected computing resource may be set up with a virtualization technology, e.g., by the workload management system, to operate the virtualized resource.

Although the example of FIG. 5 focuses on an implementation of the disclosed placement techniques for placement of newly requested resources, it will be appreciated that the disclosed network-based placement techniques can similarly be used to select a host for migration of an existing resource. Migration refers to moving virtual machine instances (and/or other resources) between hosts in a cloud computing network, or between hosts outside of the cloud computing network and hosts within the cloud. There are different types of migration including live migration and reboot migration. Techniques for various types of migration involve managing the critical phase—the time when the virtual resource is unavailable to the customer—which should be kept as short as possible. In some implementations, the described loss subscription scores and/or utilization subscription scores may be used to select resources for migration (based on determining that there is poor network performance on the host) and may also influence selection of a new host. In other implementations, a migration may be triggered for another reason (e.g., maintenance of the host, a change in parameters of the resource, etc.) and the described loss subscription scores and/or utilization subscription scores may be used to select the new host.

Figure 6:
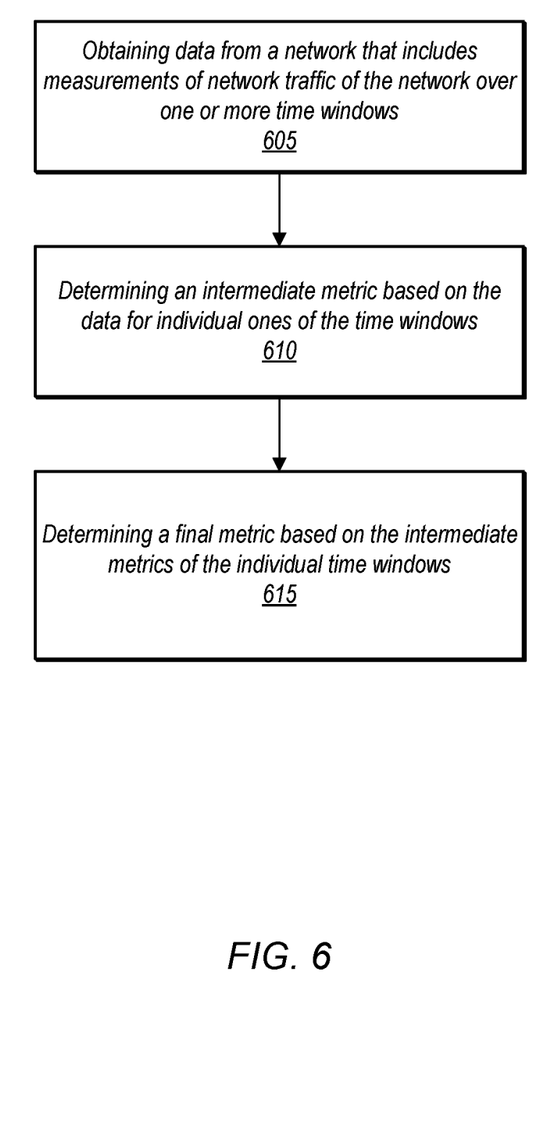
FIG. 6 is a high-level flowchart showing methods and techniques for determining metrics to evaluate network performance for a host, according to some embodiments.

FIG. 6 is a high-level flowchart showing methods and techniques for determining metrics to evaluate network performance for a host, according to some embodiments. As shown in this example, in some embodiments, data including measurements of network traffic of a network (e.g., like network 100 through which the host may be accessed) may be obtained by a metric monitor (e.g., like metric monitor 130 in FIG. 1) from the network over one or more time windows, as indicated in block 605. As described above, the measurements may include source and destination addresses of packets received and/or transmitted at an interface of a networking device, the number of packets received and/or transmitted, total bytes in the flow, time stamp in the flow, packet delay, packet loss, bandwidth measurements (capacity, achievable throughputs), and the like. The measurements may be obtained by the metric monitor from one, two, or more tiers of network connection. For instance, as described in the example in FIG. 1, the measurements may be obtained from one tier of connection including primary networking devices 115 and first-tier networking devices 120.

For each time window, an intermediate metric may be determined by the metric monitor based on the measurements, as indicated in block 610. As described above, the intermediate metric may include a loss subscription score, a utilization subscription score, and/or other metrics (e.g., a metric with respect to packet delay). An intermediate loss subscription score for a particular time window may be calculated according to equations (1)-(2), whilst an intermediate utilization subscription score for the particular time window may be calculated according to equations (3)-(4), as described above. The loss subscription score may represent performance of a network with respect to loss of network traffic (e.g., according to a pack loss threshold Tloss), whilst the utilization subscription score may represent performance of the network with respect to utilization of the network (e.g., according to a utilization threshold Tutilization). In addition, as described above, a spatial aggregation may be performed to include all the relevant interface minutes for the target tier (e.g., the first tier of network connection).

In some embodiments, a final metric may be determined by the metric monitor based on the intermediate metrics of the individual time windows, as indicated in block 615. As described above, the final metric (e.g., a loss subscription score and/or a utilization subscription score) may be calculated based on a weighted sum of the intermediate metrics according to equations (5)-(8). Thus, a temporal aggregation may be performed by including the measurements over the multiple time windows. In addition, as described above, the weights for the intermediate metrics of the individual time windows may be determined, e.g., based on a type of workload, a tuning test, or some other approaches. The final metric may be provided by the metric monitor, e.g., to a workload management system (e.g., like workload management system 135 in FIG. 1) of a provider network, to assist workload placement. As described above, the provider network may include one or more metric monitors at one data center or multiple data centers, at one or more geographic locations, and the workload placement decision may be performed on the level of data centers, tolerance zones, regions, and/or the entire provider network.

Figure 7:
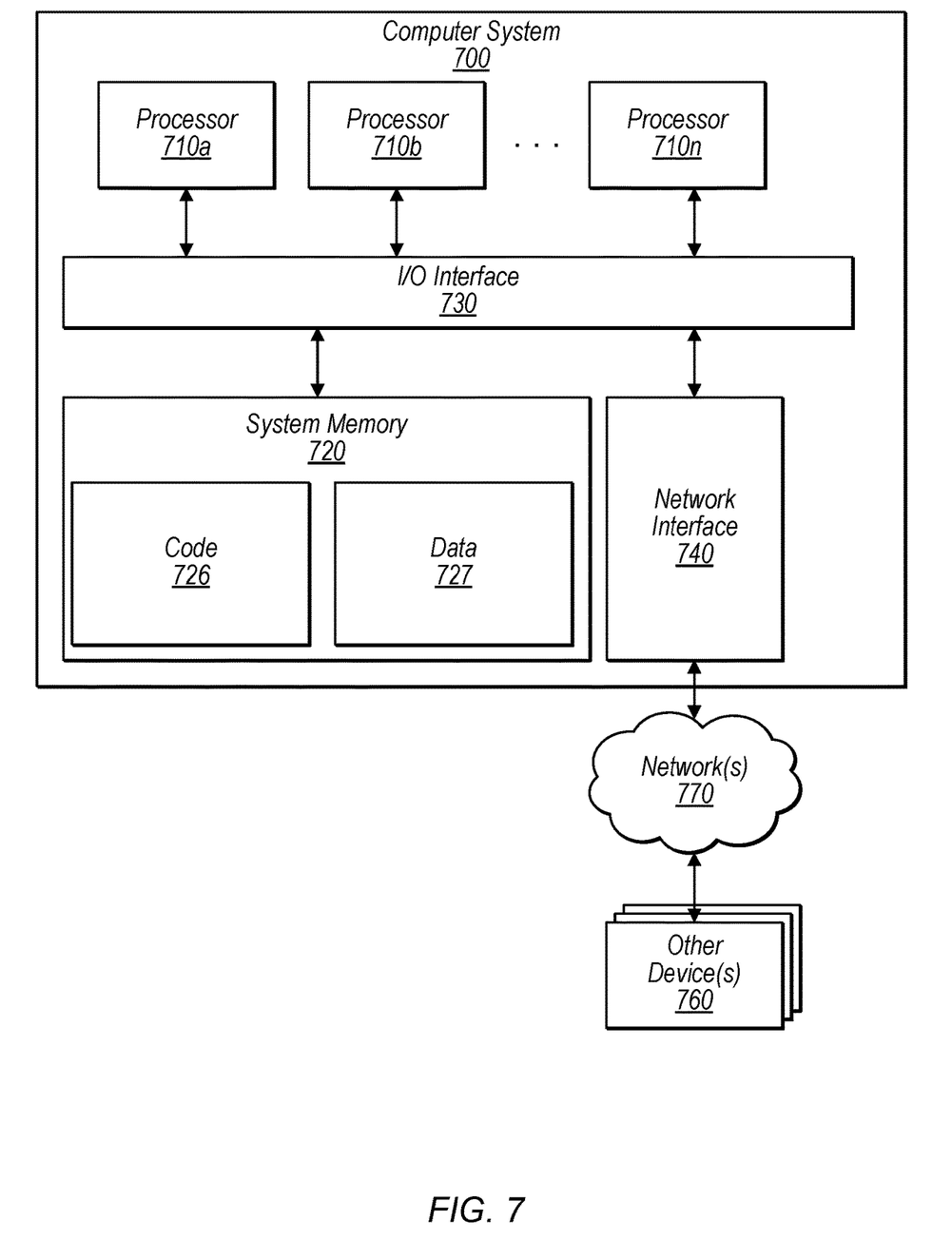
FIG. 7 is a block diagram showing an example computing system to implement the various techniques described herein, according to some embodiments.

FIG. 7 shows an example computing system to implement the various techniques described herein, according to some embodiments. For example, in one embodiment, metric monitor 130 may be implemented by a computer system, for instance, a computer system as in FIG. 7 that includes one or more processors executing program instructions stored on a computer-readable storage medium coupled to the processors. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be one embodiment of a computer-accessible medium configured to store instructions and data accessible by processor(s) 710. In various embodiments, system memory 720 may be implemented using any non-transitory storage media or memory media, such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740. In the illustrated embodiment, program instructions (e.g., code) and data implementing one or more desired functions, are shown stored within system memory 730 as code 726 and data 727.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fiber Channel SANs, or via any other suitable type of network and/or protocol.

In some embodiments, system memory 720 may be one embodiment of a computer-accessible medium configured to store program instructions and data as described above for FIG. 1-2. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
  a plurality of computing resources that are configured to host virtual machine instances; and
  at least one processor and a memory storing program instructions that when executed by the at least one processor, cause the at least one processor to implement a workload management system, wherein the workload management system is configured to:
    receive a request to obtain a virtual machine instance;
    obtain networking performance for individual ones of the plurality of computing resources according to metrics for the individual ones of the plurality of computing resources, wherein the metrics represent performance of networks through which the individual ones of the plurality of computing resources are accessed, and wherein the metrics include:
      first metrics that are calculated based, at least in part, on a measurement of time in compliance that performance of network traffic has with respect to a loss threshold for lost packets sent through the networks to the plurality of computing resources to determine a compliance percentage of a total amount of time in a time window for performing the measurement; and
      second metrics that are calculated according to a utilization threshold;
    select a particular one out of the plurality of computing resources based, at least in part, on the obtained networking performance for the plurality of computing resources; and
    provision the virtual machine instance on the particular computing resource.

2. The system of claim 1, wherein the calculation of a first metric for an individual one of the plurality of computing resources comprises:
  obtaining, using a metric monitor implemented with at least one processor and memory, data over one or more time windows from a corresponding network that includes a primary networking device connecting a plurality of networking devices to the individual computing resource, wherein the data includes a measurement of network traffic between the primary networking device and the individual ones of the plurality of networking devices;
  determining, at the metric monitor, a first intermediate metric for individual ones of the time windows based on the obtained data, wherein the first intermediate metric is calculated according to the loss threshold; and
  determining the first metric based on the first intermediate metrics for the individual ones of the time windows.

3. The system of claim 1, wherein the calculation of a second metric for an individual one of the plurality of computing resources comprises:
  obtaining, using a metric monitor implemented with at least one processor and memory, data over one or more time windows from a corresponding network that includes a primary networking device connecting a plurality of networking devices to the individual computing resource, wherein the data includes a measurement of network traffic between the primary networking device and the individual ones of the plurality of networking devices;

determining, at the metric monitor, a second intermediate metric for the individual ones of the time windows based on the obtained data, wherein the second intermediate metric is calculated according to the utilization threshold; and determining a second metric based on the second intermediate metrics for the individual ones of the time windows.

4. The system of claim 1, wherein the workload management system is part of a network-accessible computing service of a provider network.

5. A method, comprising:

receiving, at a computing resource management system, a request to obtain one of a plurality of computing resources to host a virtualized resource; and provisioning the virtualized resource on a particular one of the plurality of computing resources, comprising:

obtaining networking performance for individual ones of the plurality of computing resources according to metrics for the individual ones of the plurality of computing resources, wherein the metrics represent performance of networks through which the individual ones of the plurality of computing resources are accessed, and wherein the metrics include:

first metrics that are calculated based, at least in part, on a measurement of time in compliance that performance of network traffic has with respect to a loss threshold for lost packets sent through the networks to the plurality of computing resources to determine a compliance percentage of a total amount of time in a time window for performing the measurement; and selecting the particular computing resource out of the plurality of computing resources based, at least in part, on the obtained networking performance for the plurality of computing resources.

6. The method of claim 5, wherein the calculation of a first metric for an individual one of the plurality of computing resources comprises:

obtaining, using a metric monitor implemented with at least one processor and memory, data over one or more time windows from a corresponding network that includes a primary networking device connecting a plurality of networking devices to the individual computing resource, wherein the data includes a measurement of network traffic between the primary networking device and the individual ones of the plurality of networking devices;

determining, at the metric monitor, a first intermediate metric for individual ones of the time windows based on the obtained data, wherein the first intermediate metric is calculated according to the loss threshold; and determining the first metric based on the first intermediate metrics for the individual ones of the time windows.

7. The method of claim 6, wherein determining the first intermediate metric for a particular time window comprises:

determining a loss compliant duration of time for each interface of the primary networking device that is connected to one of the plurality of networking devices, within which a percentage of the network traffic transferred between the interface of the primary networking device and the one of the plurality of networking devices that gets lost satisfies the loss threshold;

determining a sum of the loss compliant duration of time for all the interfaces of the primary networking device that are connected to the plurality of networking devices;

determining a total interface time by multiplying a length of the particular time window with a number of all the interfaces of the primary networking devices that are connected to the plurality of networking devices; and determining a ratio between (1) the sum of the loss compliant duration of time and (2) the total interface time as the measurement of compliance.

8. The method of claim 6, wherein determining the first metric comprises determining a weighted sum of the first intermediate metrics of the individual ones of the time windows.

9. The method of claim 8, wherein weights for the weighted sum are determined according to a type of a virtualized resource running on the computing resource.

10. The method of claim 5, wherein the metrics representing the performance of the networks through which the individual ones of the plurality of computing resources are accessed further include second metrics that are calculated according to a utilization threshold, and wherein the calculation of a second metric for an individual one of the plurality of computing resources comprises:

obtaining, using a metric monitor implemented with at least one processor and memory, data over one or more time windows from a corresponding network that includes a primary networking device connecting a plurality of networking devices to the individual computing resource, wherein the data includes a measurement of network traffic between the primary networking device and the individual ones of the plurality of networking devices;

determining, at the metric monitor, a second intermediate metric for the individual ones of the time windows based on the obtained data, wherein the second intermediate metric is calculated according to the utilization threshold; and determining a second metric based on the second intermediate metrics for the individual ones of the time windows.

11. The method of claim 10, wherein determining the second intermediate metric for a particular time window comprises:

determining a compliant utilization in a duration of time for each interface of the primary networking device that is connected to one of the plurality of networking devices, within which utilization of the interface of the primary networking device satisfies the utilization threshold;

determining a sum of the compliant utilization for all the interfaces of the primary networking device that are connected to the plurality of networking devices;

determining a total interface time by multiplying a length of the particular time window with a number of all the interfaces of the primary networking devices that are connected to the plurality of networking devices; and determining a ratio between (1) the sum of the compliant utilization and (2) the total interface time.

12. The method of claim 10, wherein the metrics representing the performance of the networks further include another metric that is determined based on a statistical analysis of utilization of all interfaces of the primary networking device that are connected to the plurality of networking devices.

13. The method of claim 5, wherein the workload management system is part of a network-accessible computing service of a provider network.

14. One or more non-transitory computer readable media storing program instructions which, when executed on or across one or more processors, cause the one or more processors to perform:
- obtaining, using a metric monitored implemented with at least one processor and memory, data over one or more time windows from a network that includes a primary networking device connecting a plurality of networking devices to a computing resource configured to host one or more virtualized resources, wherein the data include a measurement of network traffic between the primary networking device and the individual ones of the plurality of networking devices;
- determining, at the metric monitor, a first intermediate metric for individual ones of the time windows based on the obtained data, wherein the first intermediate metric is calculated based, at least in part, on a measurement of time in compliance that performance of network traffic has with respect to a loss threshold for lost packets sent through the networks to the plurality of computing resources to determine a compliance percentage of a total amount of time in a time window for performing the measurement;
- determining a first metric representing the performance of the network based on the first intermediate metrics for the individual ones of the time windows; and
- providing the first metric for determining placement of a particular virtualized resource on the computing resource.

15. The one or more non-transitory computer readable media of claim 14, wherein determining the first intermediate metric for a particular time window comprises:
- determining a loss compliant duration of time for each interface of the primary networking device that is connected to one of the plurality of networking devices, within which a percentage of the network traffic transferred between the interface of the primary networking device and the one of the plurality of networking devices that gets lost satisfies the loss threshold;
- determining a sum of the loss compliant duration of time for all the interfaces of the primary networking device that are connected to the plurality of networking devices;
- determining a total interface time by multiplying a length of the particular time window with a number of all the interfaces of the primary networking devices that are connected to the plurality of networking devices; and
- determining a ratio between (1) the sum of the loss compliant duration of time and (2) the total interface time as the measurement of compliance.

16. The one or more non-transitory computer readable media of claim 14, wherein determining the first metric comprises determining a weighted sum of the first intermediate metrics of the individual ones of the time windows.

17. The one or more non-transitory computer readable media of claim 16, wherein weights for the weighted sum are determined according to a type of a virtualized resource running at the computing resource.

18. The one or more non-transitory computer readable media of claim 14, wherein the program instructions further cause the one or more processors to perform:
- determining, at the metric monitor, a second intermediate metric for the individual ones of the time windows based on the obtained data, wherein the second intermediate metric is calculated according to a utilization threshold; and
- determining a second metric representing the performance of the network based on the second intermediate metrics for the individual ones of the time windows.

19. The one or more non-transitory computer readable media of claim 18, wherein determining the second intermediate metric for a particular time window comprises:
- determining a compliant utilization in a duration of time for each interface of the primary networking device that is connected to one of the plurality of networking devices, within which utilization of the interface of the primary networking device satisfies the utilization threshold;
- determining a sum of the compliant utilization for all the interfaces of the primary networking device that are connected to the plurality of networking devices;
- determining a total interface time by multiplying a length of the particular time window with a number of all the interfaces of the primary networking devices that are connected to the plurality of networking devices; and
- determining a ratio between (1) the sum of the compliant utilization and (2) the total interface time.

20. The one or more non-transitory computer readable media of claim 18, wherein determining the second metric comprises determining a weighted sum of the second intermediate metrics of the individual ones of the time windows.

* * * * *